Figure 1:
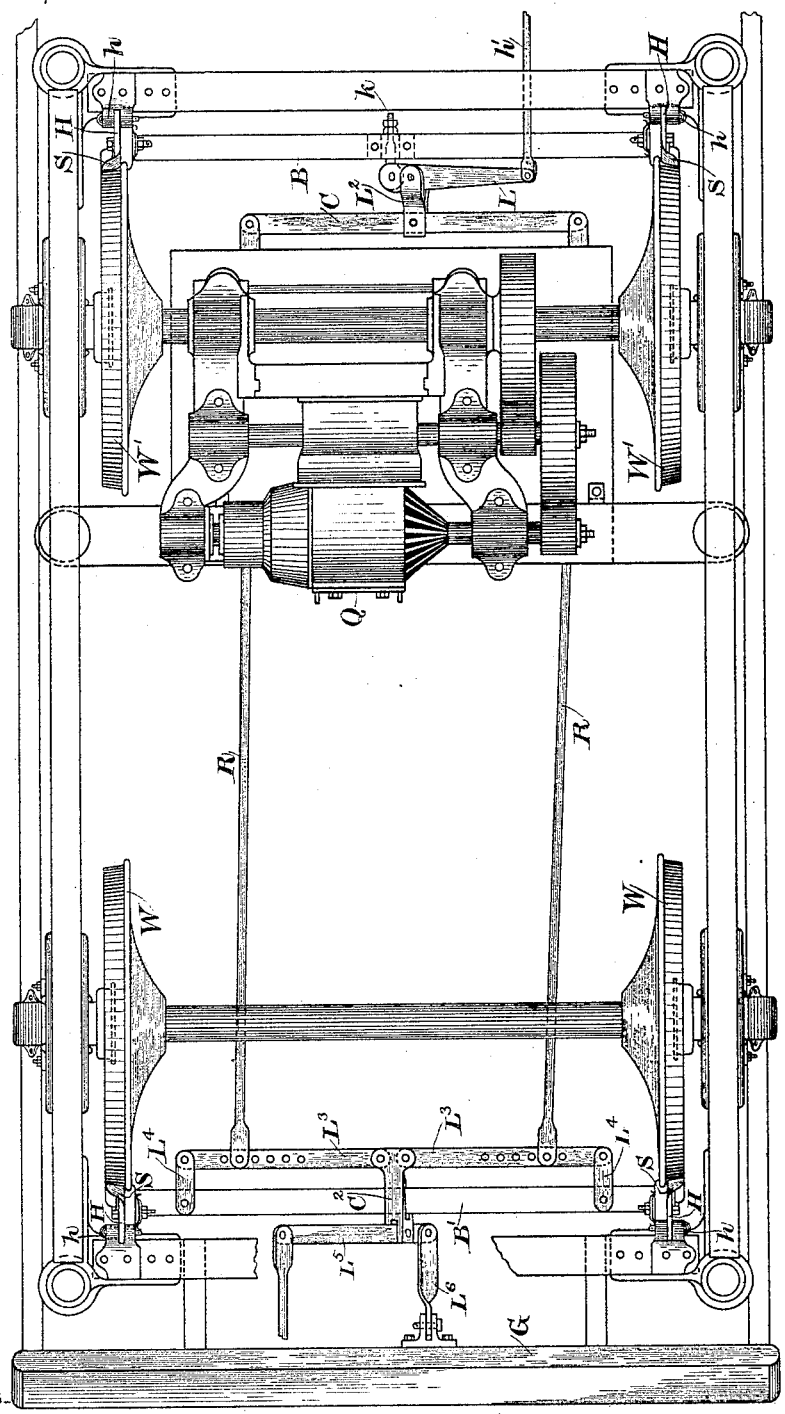

(No Model.) 3 Sheets—Sheet 1.

N. C. BASSETT.
BRAKE MECHANISM FOR STREET CARS.

No. 454,450. Patented June 23, 1891.

Witnesses.
S. B. Thompson
John H. Gibboney

Inventor.
Norman C. Bassett
by Bartley Knight
Atty.

(No Model.) 3 Sheets—Sheet 2.
N. C. BASSETT.
BRAKE MECHANISM FOR STREET CARS.
No. 454,450. Patented June 23, 1891.
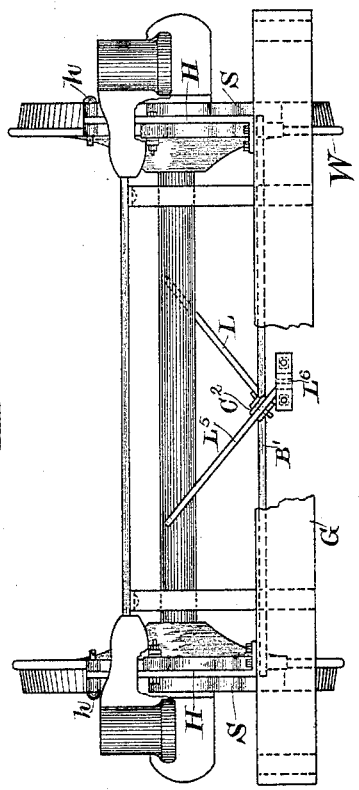
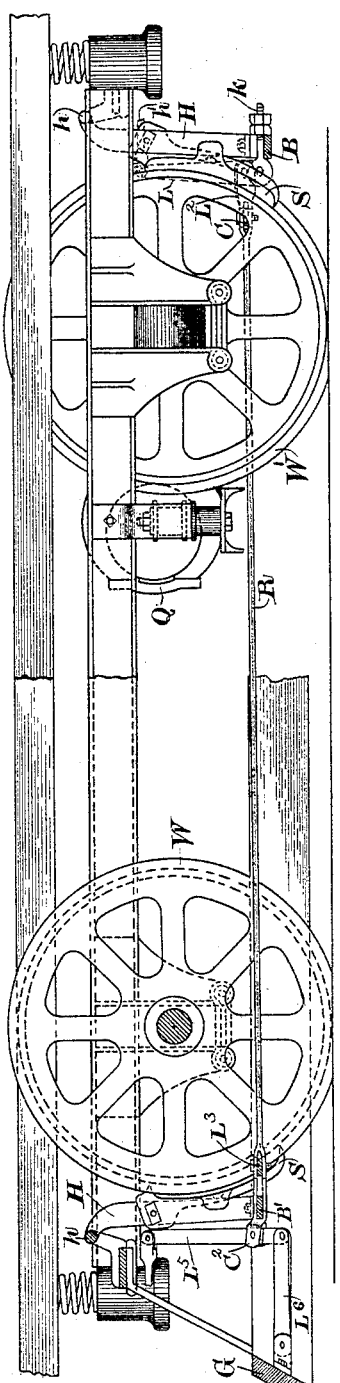

(No Model.) 3 Sheets—Sheet 3.
N. C. BASSETT.
BRAKE MECHANISM FOR STREET CARS.
No. 454,450. Patented June 23, 1891.
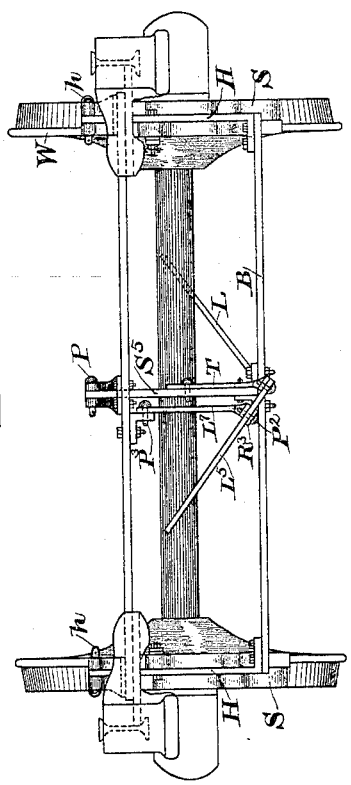
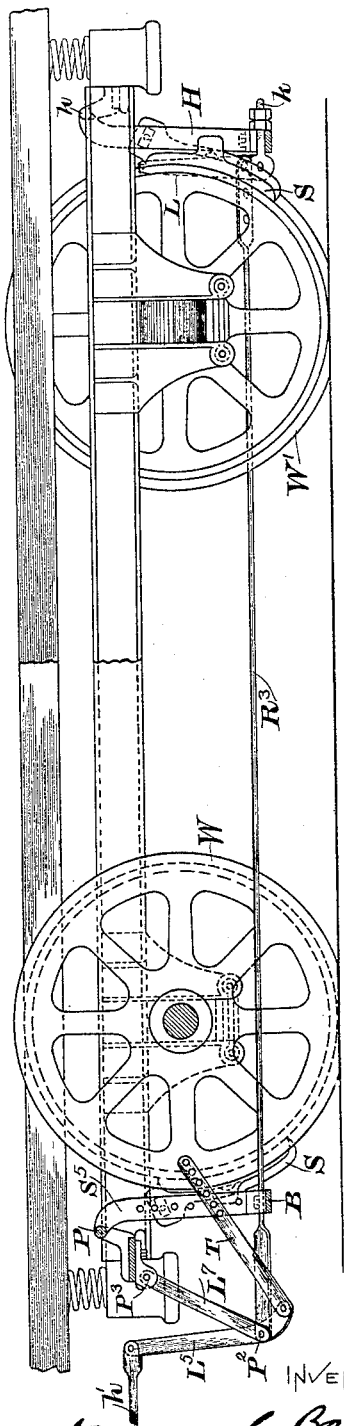
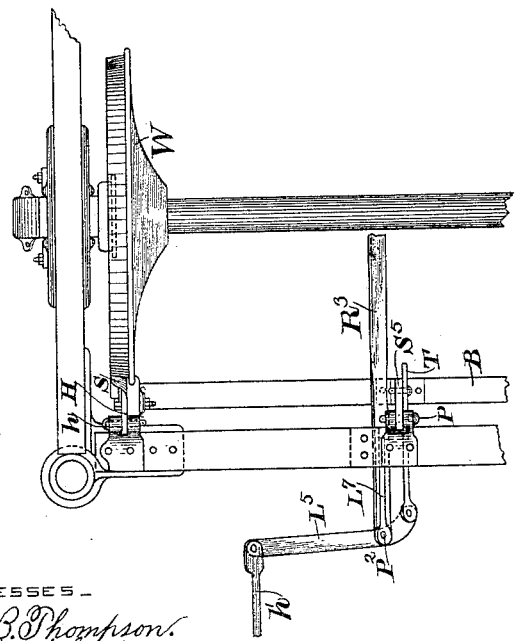
Witnesses—
S. B. Thompson.
John H. Gibboney.
Inventor—
Norman C. Bassett
by Brinkley & Knight
Attys

UNITED STATES PATENT OFFICE.

NORMAN C. BASSETT, OF LYNN, MASSACHUSETTS, ASSIGNOR TO THE THOMSON-HOUSTON ELECTRIC COMPANY, OF CONNECTICUT.

BRAKE MECHANISM FOR STREET-CARS.

SPECIFICATION forming part of Letters Patent No. 454,450, dated June 23, 1891.

Application filed December 29, 1890. Serial No. 376,012. (No model.)

*To all whom it may concern:*

Be it known that I, NORMAN C. BASSETT, a citizen of the United States, residing at Lynn, county of Essex, and State of Massachusetts, have invented a certain new and useful Improvement in Brake Mechanism for Street-Cars, of which the following is a specification.

The present invention relates to a peculiar form of brake mechanism adapted for use particularly on electric-motor trucks, which, as now constructed, often have the propelling motor so arranged and geared as to give an unequal tractive power to the wheels upon the different axles of the truck. In such cases, if the brakes are applied with equal pressure on all the wheels, the more lightly-loaded wheels, having less tractive hold on the rails, will slip, while the more heavily-loaded ones still revolve. This tendency is still further increased by the momentum of the heavy armature, geared to the loaded axle, which runs at a high rate of speed and requires considerable brake-action to stop it. With trucks thus constructed, as might be expected from the above considerations, it has been found that the light wheels skid along the track, wearing flat surfaces thereon, and after a few months these flat spots become so marked as to produce an uneven jolting motion, destructive to the track and truck and exceedingly disagreeable to the passengers. To avoid these difficulties and the considerable expense necessary for repairing the flattened wheels, the brake mechanism shown in the accompanying drawings has been designed.

The object in view is to so construct the brake that the braking pressure applied to the light wheels may be made enough less than that on the loaded wheels to prevent skidding of the former before the latter also cease turning and the car stops. The braking pressure upon the loaded wheels must of course be balanced by an equal counter-pressure, but heretofore the counter-pressure has been brought solely upon the second set of wheels, whereas I now subdivide it in a proper proportion between the light wheels and the frame of the truck itself. This I accomplish by connecting the brake-gear joining the brakes to the truck-frame in such a manner that a portion of the strain balancing the braking action on the loaded wheels is transmitted to the truck, and only the remaining portion acts directly upon the light wheels.

The mechanism constituting my invention also comprises means for adjusting the connections of the brake-gear, so that though different kinds or arrangements of motors be used, which vary the amount of inequality between the tractive power of the different wheels, still it will be possible to divide the braking strain between the truck and light wheels in such proportion as to secure the described function which is the object of this invention.

In the accompanying drawings, Figure 1 shows a plan view of a car-truck with an electric motor Q journaled on one axle in the ordinary manner, and showing at the other end of the truck the differential brake mechanism, as it is preferably arranged. Fig. 2 shows an end view, and Fig. 3 a side view, of the same; and Figs. 4, 5, and 6 show, respectively, end, plan, and side elevations of a modified form of brake mechanism to accomplish the same end.

Referring to Fig. 1, it will be seen that the brake-shoes S, suspension-bars H, and cross-bar B, serving as a brake-beam, are patterned as in my application for Letters Patent filed January 7, 1891, Serial No. 377,059. The suspension-bars are hinged to the truck at $h$ and control the action of the brake-shoes. These same features of construction, however, are claimed in my foregoing application, and are mentioned here only as incidental to other features of novelty, which will now be described.

The brake-lever L has a pivotal bearing upon the brake-beam B by means of an eye-bolt $k$, and its outer end is connected by rod or chain $h'$ to a brake spindle or lever under the control of the driver of the car. To the lever L is pivoted link $L^2$, mounted at the center of a cross-bar C, to the ends of which are attached pull rods or chains R R, which pass underneath the motor and are connected, respectively, to the second brake-beam B' by links $L^4 L^4$. In this way the brake-beam B is connected to the opposite brake-beam B', and it is also connected to the framing of the truck as follows: To the inner ends of the levers L³ L³ are secured a connecting-link C², which is pivoted to the brake-lever L⁵, and this brake-lever, instead of bearing directly upon the brake-beam is fulcrumed upon the truck-frame by the link L⁶, as shown in Fig. 1. Now when pressure is applied to the brakes by turning the brake-windlass the rods R R will be put under heavy tension, thus forcing the brake-shoes against the different wheels; but since the rods R R are connected to the levers L³ L³ at a point between the links L⁴ and C² the amount of braking pressure upon the wheels W W will be less than the total pressure applied to the loaded wheels W' W', for a portion will be transmitted through the link C², lever L⁵, and link L⁶ to the guard-board G or other fixed point on the truck.

The levers L³ have a series of holes, and the connection of rods R R to them can be adjusted by fitting a pin in any desired one of the holes. This allows an adjustment of the braking pressure applied to the different wheels to correspond with the varying tractive powers which the wheels may have under different conditions. For example, if the left-hand ends of the rods R R were placed midway between the links L⁴ and C² then the braking pressure upon the wheels W W would theoretically be just one-half the pressure upon wheels W' W'. If now the rods are moved toward the link C², the pressure of the brakes upon wheels W W will be diminished, while if they be moved nearer to links L⁴ the pressure upon the said wheels will be increased in a like ratio.

As there are a number of different ways of modifying the brake-gear and still accomplishing the differential braking action desired, I show in Figs. 4, 5, and 6 one other arrangement, differing somewhat from that already described. The electric motor is not now illustrated; but it will be understood that wheels W' W' are, as before, the loaded wheels, and W W the light ones. The brake-gear is connected with the shoes bearing upon the loaded wheels in the same manner as before, with the single exception that one pull-rod R³ alone is used, pivoted directly to the brake-lever L. At its other end the rod R³ is pivoted to the lever L⁵, and L⁵ is fulcrumed upon the truck-frame by a swinging link L⁷. A thrust-rod T is pivoted to the lower end of the lever L⁵, and is adjustably connected by a pin with a suspension-bar S⁵, bolted to the cross-bar or brake-beam B, and pivoted at its upper end to the truck-frame at P. This modified mechanism operates in the following manner: When the lever L⁵ is pulled toward the left to set the brakes, the pivot-point P² will move also slightly toward the left, swinging in the arc of a circle from the point of support P³. The pivot-point of the thrust-rod will be moved to the right with reference to the point P², and this will result in bringing a strong tensional pull on the rod R³ and a corresponding compression thrust upon the bar T; but as the bar T is attached to the suspension-bar S⁵ at a point between the pivot P and brake-beam B only a portion of the thrust is transmitted directly to the brakes, and consequently this modified mechanism produces the same result as that illustrated in the preceding figures. The means for adjusting the rod T with reference to S⁵ are the same as before described, and it will be understood that in both cases other means of adjustment may be readily substituted.

What I claim as new, and desire to secure by Letters Patent, is—

1. The combination of a truck propelled by a motor arranged and geared so that the tractive power of the wheels upon the different axles is rendered unequal, with brakes for the wheels, connecting brake-gear, and adjustable means for changing at will the leverages by which the braking power is applied to the different wheels, so as to keep the braking pressure proportioned to their unequal tractive effects, as described.

2. The combination of a truck having a motor geared to and largely supported upon one axle, whereby the tractive power of the wheels upon the different axles is unequal, with brakes for both sets of wheels, connected together by suitable rods and levers or like power-transmitting connections, and adjustable means for varying the leverages by which the braking power is applied to the wheels, and thus differentiating the pressure thereon in proportion to their tractive power, as set forth.

3. The combination of a truck propelled by a motor arranged and geared so that the tractive power of the wheels upon the different axles is rendered unequal, with brakes for both sets of wheels, and brake-gear connecting the brakes and having also a bearing upon the frame-work of the truck such that the braking pressure upon the loaded wheels is balanced by pressure upon the second set of wheels and strain coming upon the truck.

4. The combination of the truck having an electric motor geared and arranged so that the tractive power of the wheels upon the different axles is rendered unequal, with brakes and brake-beams for the wheels, and a pull rod or chain connected at one end of the truck with the brake apparatus for the more heavily-loaded wheels, and at the other end to the brake apparatus for the lightly-loaded wheels and the truck-frame as well, whereby the strain at the latter end will be divided between the brakes and truck, and means for adjusting the connections to vary the amount of braking pressure applied directly to the light wheels, as described.

5. The combination of a vehicle driven by a motor so arranged and geared as to render the tractive power of the wheels upon the different axles unequal, with the brakes, brake-beams, and brake-gear connecting one beam with the second beam and to the truck-frame as well, and means for operating the brake-gear, whereby the braking action on the different wheels is differentiated in accordance with their respective tractive power, as set forth.

6. The combination of a truck-axle having an electric motor geared thereto and supported largely thereon, and a brake-beam B, connected to the brake apparatus for the wheels on said axle, with the brake-beams B' and brakes for the wheels of a separate axle, a rod or chain connecting the beam B with the beam B' and truck-frame, and means for adjusting the connection with the beam B' so as to vary the braking action upon the light set of wheels, as set forth.

7. The combination of a truck having an electric motor geared and supported thereon, so that the tractive power of the wheels upon the different axles is rendered unequal, with brakes for both sets of wheels, and a pull rod or chain connected at one end to the brake apparatus for the loaded wheels and at its other end to a lever connected both with the truck-frame and brake apparatus for the light wheels, and means for adjusting the connection of the rod relatively to the lever for varying the braking pressure applied to the last-named wheels, as set forth.

In testimony whereof I have hereto set my hand this 22d day of December, 1890.

NORMAN C. BASSETT.

Witnesses:
JOHN W. GIBBONEY,
JOSEPH H. JENKINS.